US008880906B2

(12) United States Patent
Tupper (10) Patent No.: US 8,880,906 B2
(45) Date of Patent: Nov. 4, 2014

(54) STORING ENCRYPTED CONTENTS IN DIGITAL ARCHIVES (71) Applicant: AppSense Limited, Warrington (GB)

(72) Inventor: James Tupper, Warrington (GB)

(73) Assignee: Appsense Limited (GB)

( * ) Notice: Subject to any disclaimer, the term of this patent is extended or adjusted under 35 U.S.C. 154(b) by 9 days.

(21) Appl. No.: 13/830,782

(22) Filed: Mar. 14, 2013

(65) Prior Publication Data
US 2014/0281583 A1 Sep. 18, 2014

(51) Int. Cl.
G06F 12/14 (2006.01)
H04L 9/32 (2006.01)
G06F 21/60 (2013.01)

(52) U.S. Cl.
CPC ...................................... G06F 21/60 (2013.01)
USPC ............................ 713/193; 713/160; 713/171

(58) Field of Classification Search
None
See application file for complete search history.

(56) References Cited

U.S. PATENT DOCUMENTS

| 7,117,365 | B1 * | 10/2006 | Rump et al. | 713/176 |
|---|---|---|---|---|
| 7,237,108 | B2 * | 6/2007 | Medvinsky et al. | 713/160 |
| 7,434,052 | B1 * | 10/2008 | Rump | 713/171 |
| 7,447,313 | B2 * | 11/2008 | Van Rijnsoever | 380/207 |
| 8,104,092 | B1 * | 1/2012 | Emigh | 726/26 |
| 8,549,306 | B2 * | 10/2013 | Yoshioka et al. | 713/176 |
| 2002/0059522 | A1 * | 5/2002 | Hirano et al. | 713/193 |
| 2008/0289039 | A1 * | 11/2008 | Rits et al. | 726/22 |
| 2010/0095114 | A1 * | 4/2010 | Greene et al. | 713/160 |
| 2012/0284515 | A1 * | 11/2012 | Yamaguchi et al. | 713/168 |

* cited by examiner

Primary Examiner — Fikremariam A Yalew
(74) Attorney, Agent, or Firm — Wilmer Cutler Pickering Hale and Dorr LLP (57) ABSTRACT A digital archive for storing encrypted content includes a header section and a body. The header section includes real headers, wherein at least a portion of each real headers is encrypted, and fake headers, wherein each of the fake headers is filled with cryptographically random bytes, wherein the fake headers are substantially more than the real headers. The body includes real contents, wherein at least a portion of each real content is encrypted, and fake contents in the rest of the body, wherein the fake content contains additional cryptographically random bytes, wherein the amount of the fake content is substantially greater than the amount of the real contents, wherein each of the real headers refers to a corresponding real content in the body and contains decryption information for the corresponding real content.

21 Claims, 5 Drawing Sheets

FIG. 1

| Real Header 115/115' | Header Salt 210 | Header IV 220 | Header Hash 230 | Start Location 240 | End Location 250 | Content Key 260 | Content IV 270 | Content Hash 280 |
|---|---|---|---|---|---|---|---|---|

STORING ENCRYPTED CONTENTS IN DIGITAL ARCHIVES

BACKGROUND

Security and encryption have become increasingly important as privacy and security concerns grow stronger with more of peoples' lives being online Conventional encryption vehicles, such as Microsoft's Encrypted File System (EFS), Pretty Good Privacy (PGP), ZIP, and RAR, can provide encryption for a complete archive or on a file-by-file basis. However, because the existence and number of encrypted files are generally not hidden, this can weaken the security by allowing these files to be targeted directly for attack, making conventional encryption files subject to security breaches.

SUMMARY

In accordance with the disclosed subject matter, systems and methods are described for storing encrypted contents in digital archives.

Disclosed subject matter includes, in one aspect, a non-transitory computer readable medium comprising a digital archive for storing encrypted content, which includes a header section, including a first number of real headers, wherein at least a portion of each of the first number of real headers is encrypted, and a second number of fake headers, wherein each of the second number of fake headers is filled with cryptographically random bytes, wherein the second number is substantially greater than the first number, and a body, including the first number of real content, wherein at least a portion of each of the first number of real content is encrypted, and fake content in the rest of the body, wherein the fake content contains additional cryptographically random bytes, wherein the amount of the fake content is substantially greater than the amount of the real contents, wherein each of the first number of real headers refers to a corresponding one of the first number of real content in the body and contains decryption information for the corresponding one of the first number of real contents.

In some embodiments, each of the real headers contains a start location of the corresponding real content in the body.

In some other embodiments, the start location is a modulus of a size of the digital archive.

In some other embodiments, each of the real headers contains an end location of the corresponding real content in the body.

In some other embodiments, the end location is a modulus of a size of the digital archive.

In some other embodiments, less than 1% of the header section contains real headers.

In some other embodiments, each of the real headers contains a header salt for decrypting the real header.

In some other embodiments, each of the real headers contains a header initialization vector (IV) for decrypting the each of the real header.

In some other embodiments, each of the real headers contains a header hash for verifying decryption of the real header.

In some other embodiments, each of the real headers contains a content key for decrypting the corresponding real content in the body.

In some other embodiments, each of the real headers contains a content initialization vector (IV) for decrypting the corresponding real content in the body.

In some other embodiments, each of the real headers contains a content hash for verifying decryption of the corresponding real content in the body.

In some other embodiments, each of the real headers and the fake headers has a fixed size.

In some other embodiments, the digital archive further includes a master header defining a size of the header section.

In some other embodiments, the digital archive further includes a master header defining a layout of the header section.

In some other embodiments, the master header contains a start location of each of the first number of real headers and the second number of fake headers in the header section.

Disclosed subject matter includes, in another aspect, a computerized method for storing encrypted contents in a digital archive, which includes receiving real content to be stored in a body of the digital archive, determining a content location in the body for the real content, generating a real header for the real content, the real header referring to the content location of the real content and containing content decryption information relating to the real content, determining a header location in a header section of the digital archive for the real header, encrypting at least a portion of the real header using header encryption information, inserting the real header into the header section according to the header location, filling unused portions of the header section with fake headers that include cryptographically random bytes, wherein the number of fake headers is substantially greater than the number of encrypted contents, encrypting at least a portion of the real content with content encryption information, inserting the real content into the body according to the content location, and filling unused portions of the body with fake content that includes additional cryptographically random bytes, wherein the amount of fake content is substantially greater than the amount of encrypted contents.

In some embodiments, the computerized method for storing encrypted contents in a digital archive further includes determining a size of the digital archive.

In some other embodiments, the computerized method for storing encrypted contents in a digital archive further includes determining the size of the digital archive at least partially based on a number and amount of expected real contents.

In some other embodiments, the computerized method for storing encrypted contents in a digital archive further includes generating a header salt for the real header and adding the header salt to the real header.

Disclosed subject matter includes, in yet another aspect, a system for storing encrypted contents in a digital archive, which includes an input interface configured to receive real content to be stored in a body of the digital archive, a body manager configured to manage the body of the digital archive and determine a content location in the body for the real content, a real header generator configured to generate a real header for the real content, wherein the real header referring to the content location of the real content and containing content decryption information relating to the real content, a header section manager configured to manage a header section of the digital archive and determine a header location for the real header, and an encryption engine configured to encrypt the real header and the real content, wherein the header section manager is further configured to insert the real header into the header section according to the header location and to fill unused portions of the header section with fake headers that include cryptographically random bytes, the number of fake headers being substantially greater than the number of encrypted contents, wherein the body manage is further configured to insert the real content into the body according to the content location and to fill unused portions of the body with fake content that include additional cryptographically random bytes, the amount of fake contents being substantially greater than the amount of encrypted contents.

In some embodiments, the input interface is further configured to receive header encryption information.

In some other embodiments, the system for storing encrypted contents in a digital archive further includes an archive manager configured to manage the digital archive.

In some other embodiments, the system for storing encrypted contents in a digital archive further includes an encryption facilitator configured to facilitate encryption.

In some other embodiments, the system for storing encrypted contents in a digital archive further includes a random byte generator configured to generate the cryptographically random bytes and the additional cryptographically random bytes.

Various embodiments of the subject matter disclosed herein can provide one or more of the following capabilities. An encrypted content storing system can provide more effective and robust mechanisms of storing secure contents. One or multiple secrets (e.g., digital certificates, messages, files, etc.) from multiple users/sources can be embedded in a haystack of random and meaningless data in a digital archive. The number of secrets can be hidden from normal examination of the file by unauthorized users. Attacking a digital archive can be made more costly and time-consuming since it is difficult to determine when the attack is complete.

These and other capabilities of embodiments of the invention will be more fully understood after a review of the following figures, detailed description, and claims.

DETAILED DESCRIPTION

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

Various embodiments of the subject matter disclosed herein can provide more effective and robust mechanisms of storing encrypted contents in, for example, digital archives. According to some embodiments, one or multiple secrets (e.g., digital certificates, messages, files, etc.) from multiple users/sources can be embedded in a haystack of random and meaningless data in a digital archive. The existence of any secrets can be unknown to unauthorized users. The number of secrets stored in a digital archive can be hidden from normal examination of the file by unauthorized users, thus enhancing security and improving privacy. In some situations, an attacker will not know for sure if all stored secrets have been recovered without exhausting the entire digital archive which can contain only a very small amount of real data disguised by a much larger amount of fake data.

The following user scenario can demonstrate certain aspects of the disclosed subject matter: Digital certificates can be used to send secure messages. Sometimes a sender may use multiple digital certificates to send messages. To enhance security and privacy, however, the sender may not want the fact known to others that it is using multiple digital certificates. When the sender uses an encrypted content storing system according to certain embodiments of the disclosed subject matter, the sender can store multiple digital certificates into a digital archive. An attacker examining the digital archive will not know how many, if any, digital certificates are stored in the digital archive and used to send a message. Lack of this knowledge can enhance security and improve privacy. An encrypted content storing system according to certain embodiments of the disclosed subject matter can be used to store any kind of digital information in digital archives.

Figure 1:
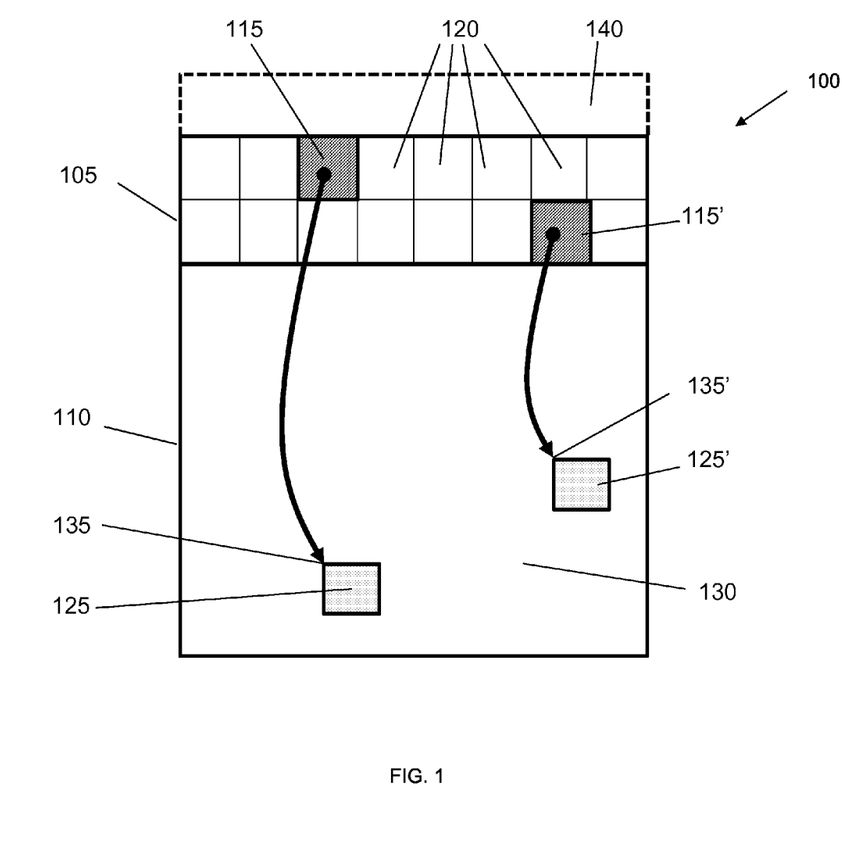
FIG. 1 illustrates an exemplary structure of a digital archive according to certain embodiments of the disclosed subject matter.

FIG. 1 illustrates a block diagram of an exemplary structure of a digital archive 100 according to certain embodiments of the disclosed subject matter. The digital archive 100 can include a header section 105 and a body 110. The header section 105 can include real headers (e.g., 115 and 115') and fake headers (e.g., 120). The body 110 can include real contents (e.g., 125 and 125') and fake contents (e.g., 130). The digital archive 100 can have some or all of these components and can also have additional components. In addition, one or more of the components of the digital archive 100 can be either separate/distinct or combined/merged.

Referring to FIG. 1, at least a portion of each real header 115/115' can be encrypted. Various symmetric or asymmetric encryption mechanisms can be utilized. In one example, symmetric encryption algorithm such as AES or Serpent can be used. In some embodiments, a key for encrypting a real header 115/115' can be generated from a passphrase using a key generation algorithm (KGA) such as pbkdf2 or bcrypt. The fake headers 120 can be used to disguise the existence of any real headers 115/115'. A passphrase can be provided by the owner/source/possessor/controller of a secret to be stored in the digital archive 100. Additionally, the passphrase can be randomly generated. In one example, fake headers 120 are filled with cryptographically random bytes so that they are not distinguishable from real headers 115/115'. A user such as a hacker would not be able to easily tell whether a header is real or fake without decrypting the header. In some embodiments, the boundary of each header (real or fake) is unknown, thus increasing the difficulty of identifying real headers by, for example, unauthorized users. A real header 115/115' can be stored in a binary format. Alternatively, a real header 115/115' can be stored in a text-based structure (e.g., based on Extensible Markup Language (XML) or JavaScript Object Notation (JSON), etc.) with an extra field that contains characters to pad the real header 115/115' to the required length. In this example, fields of the text-based structure can be specified as text and the order of the fields can be randomized. This can make any plaintext attacks much harder.

The number of headers (including real headers 115/115' or fake headers 120) can be arbitrary. Although FIG. 1 shows only 16 headers as an example, the header section 105 can include hundreds of, thousands of, or even more headers. Preferably, the header section 105 can be heavily overprovisioned, e.g., the number of fake headers 120 can be substantially greater than the number of the real headers 115/115'. In one example, less than 1% of the header section 105 contains real headers 115/115'; the rest contains fake headers 120. The high overprovisioning can increase the cost of hacking the digital archive 100. In addition, the high overprovisioning can help hide the existence of any real headers 115/115' and/or disguise the number of real headers 115/115' in the digital archive 100. In some embodiments, the number of headers (including real headers 115/115' and fake headers 120) is unknown to, for example, unauthorized users and sometimes even to authorized users.

Still referring to FIG. 1, at least a portion of each real content 125/125' can be encrypted. Various symmetric or asymmetric encryption mechanisms can be utilized. In one example, symmetric encryption algorithm such as AES or Serpent can be used. The fake contents 130 can be used to disguise the existence of any real contents 125/125'. In one example, fake contents 130 are filled with cryptographically random bytes so that they are not distinguishable from real contents 125/125'. Thus, a user such as a hacker would not easily tell whether a segment of the body 110 contains a real content 125/125' or a fake content 130 without decrypting the segment. In some embodiments, the boundary of segments in the body is unknown, thus increasing the difficulty of identifying real contents by, for example, unauthorized users.

The amount of real content (e.g., 125/125') in the body 110 can be arbitrary. Preferably, the body 110 can be heavily overprovisioned, e.g., the amount of fake contents 130 can be substantially greater than the amount of real contents 125/125'. In one example, less than 1% of the body 110 contains real contents 125/125'; the rest contains fake contents 130. The high overprovisioning can increase the cost of hacking the digital archive 100. In addition, the high overprovisioning can help hide the existence of any real contents 125/125' and/or disguise the amount of real contents 125/125' in the digital archive 100. Preferably, the number of real contents 125/125' is unknown to, for example, unauthorized users and sometimes even to authorized users.

Still referring to FIG. 1, each real header 115/115' in the header section 105 can refer to one real content 125/125' in the body 110. In some embodiments, a real header 115/115' can have a start location 135/135' of a real content 125/125' in the body 110. When a real header 115/115' is decrypted, the corresponding real content 125/125' can be readily located in the body 110 based on, for example, the start location 135/135'. In addition, each real header 115/115' in the header section 105 can contain decryption information of one real content 125/125' in the body 110. If a symmetric mechanism is adopted, the decryption information can be same as the encryption information. When a real header 115/115' is decrypted, the corresponding real content 125/125' can be readily decrypted using the decryption information contained in the real header 115/115'. In some embodiments, a key for encrypting/decrypting a real content 125/125' can be the same as the key for encrypting/decrypting its corresponding header 115/115'. In some other embodiments, a key for encrypting/decrypting a real content 125/125' can be randomly generated and different from the key for encrypting/decrypting its corresponding header 115/115'.

Optionally, the digital archive 100 can also include a master header 140. In some embodiments, the master header 140 can define a size of the header section 105. In some other embodiments, the master header 140 can define a layout of the header section 105. For example, the master header 140 can contain a start location of each real header 115/115' and fake header 120 in the header section 105. In yet some other embodiments, the master header 140 can define the other information about the header section 105, the body 110, and/or the digital archive 100, such as the size/format of the body section 110, the size/format of the digital archive 100, the number of total headers 115/115' and 120, the ratio of real headers over total headers, etc. The master header 140 can be fixed or configurable (e.g., based on a system policy or user inputs). In some embodiments, the master header 140 is unencrypted.

Figure 2:
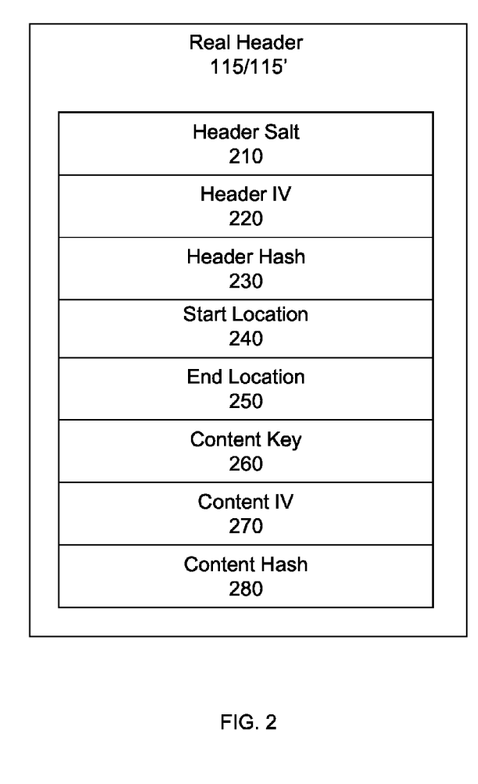
FIG. 2 illustrates an exemplary structure of a real header according to certain embodiments of the disclosed subject matter.

FIG. 2 illustrates an exemplary structure of a real header 115/115' in the header section 105 of the digital archive 100 according to certain embodiments of the disclosed subject matter. The real header 115/115' can include a header salt 210, a header initialization vector (IV) 220, a header hash 230, a start location 240, an end location 250, a content key 260, a content IV 270, and a content hash 280. The real header 115/115' can have some or all of these components and can also have additional components. In addition, one or more of the components of the real header 115/115' can be either separate/distinct or combined/merged. The real header 115/115' is exemplary and may or may not include all of the fields shown in FIG. 2.

The header salt 210 can be used to encrypt/decrypt the real header 115/115'. Salt can be random data that is used as an additional input to an encryption function that hashes a password or passphrase. In some embodiments, a passphrase can be fed into a key generation algorithm (KGA) along with the header salt 210 to generate a key for encrypting/decrypting the real header 115/115'. A passphrase can be provided by the owner/source/possessor/controller of a real content 125/125' or randomly generated. The header salt 210 can increase the difficulty and cost of hacking the digital archive 100. The header salt 210 can be randomly generated or derived from other information (e.g., a hash of other information, such as the start location 240 of the real header 115/115' in the header section 105). In some embodiments, the header salt 210 is unencrypted.

The header IV 220 can be used to decrypt the real header 115/115'. The header IV 220 can be randomly generated, fixed and hardcoded, or derived from other information (e.g., a hash of other information, such as the end location 250 of the real header 115/115'). In some embodiments, the header IV is unencrypted. An IV (Initialization Vector) can be extra information used by some encryption algorithms as a starting state for the encryption/decryption engine.

The header hash 230 can be used to verify decryption of the real header 115/115'. The header hash 230 can be generated by a hashing algorithm (e.g., SHA512) based on some portions of the real header 115/115' (e.g., the start location 240, the end location 250, and/or the content key 260, etc.). The header hash 230 can be encrypted or unencrypted.

The start location 240 can contain the start location of the corresponding real content 125/125' in the body 110. The start location 240 can be an integer in the range of 0 to the length/size of the digital archive 100. In some embodiments, the start location 240 can be a modulus, e.g., of the length/size of the digital archive 100. The start location 240 can preferably be encrypted.

The end location 250 can contain the end location of the corresponding real content 125/125' in the body 110. The end location 250 can be an integer in the range of 0 to the length/size of the digital archive 100 and can be greater than the start position 240. In some embodiments, the end location 250 can be a modulus, e.g., of the length/size of the digital archive 100. The end location 250 can be optional if the size of the corresponding real content is known or otherwise determinable. The end location 250 can preferably be encrypted.

The content key 260 can contain the key for decrypting the corresponding real content 125/125'. In some embodiments, the content key 260 for encrypting/decrypting a real content 125/125' can be the same as the key for encrypting/decrypting its corresponding header 115/115'. In some other embodiments, the content key 260 for encrypting/decrypting a real content 125/125' can be randomly generated and different from the key for encrypting/decrypting its corresponding header 115/115'. The content key 260 can preferably be encrypted.

The content IV 270 can be used to decrypt the corresponding real content 125/125'. The content IV 270 can be randomly generated or derived from other information (e.g., a hash of other information, such as a portion of the real header 115/115'). The content IV 270 can also be same as the header IV 220. The content key 260 can be encrypted or unencrypted.

The content hash 280 can be used to verify decryption of the corresponding real content 125/125'. The content hash 280 can be generated by a hashing algorithm (e.g., SHA512) based on some portions or all of the corresponding real content 125/125'. In some embodiments, decryption of the corresponding content 125/125' can continue until a hash of the decrypted content matches the content hash 280. In this situation, the end location 250 can be optional. The header hash 230 can be encrypted or unencrypted.

In some embodiments, a real header 115/115' can only include a start location 240 and a content key 260 while a content IV 270 and/or a content hash 280 can be stored along with the real content 125/125' in the body 110 of the digital archive 100.

Figure 3:
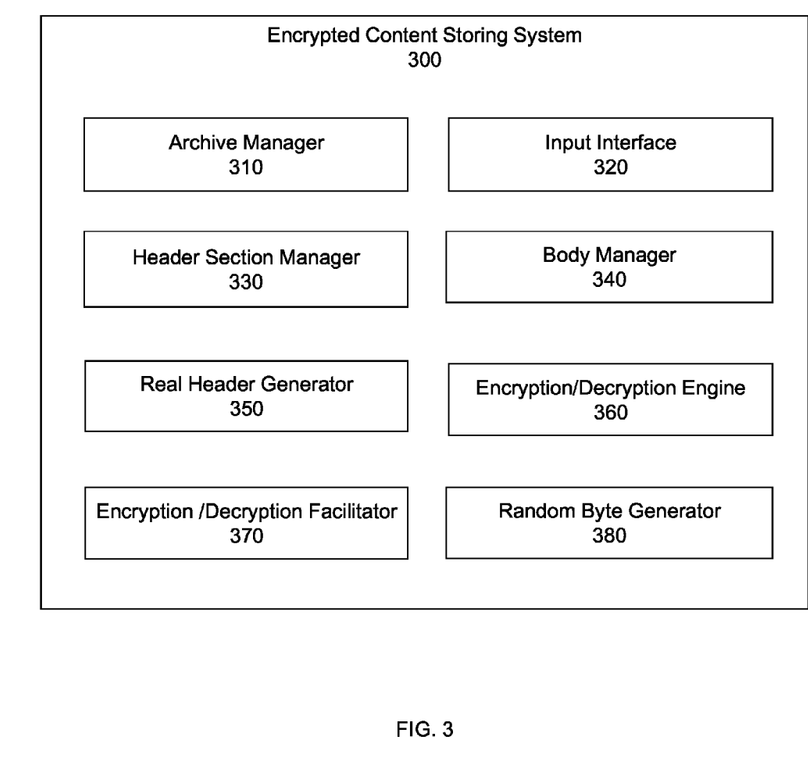
FIG. 3 illustrates a block diagram of an exemplary encrypted content storing system according to certain embodiments of the disclosed subject matter.

FIG. 3 illustrates a block diagram of an exemplary encrypted content storing system 300 according to certain embodiments of the disclosed subject matter. The encrypted content storing system 300 can store encrypted content in a digital archive before the content is transmitted or stored. The encrypted content storing system 300 can include an archive manager 310, an input interface 320, a header section manager 330, a body manager 340, a real header generator 350, an encryption/decryption engine 360, an encryption/decryption facilitator 370, and a random byte generator 380. The encrypted content storing system 300 can have some or all of these components and can also have additional components. In addition, one or more of the components of the encrypted content storing system 300 can be either separate/distinct or combined/merged.

The archive manager 310 can manage a digital archive 100. In some embodiments, the archive manager 310 can configure the format of a digital archive 100. For example, the archive manager 310 can configure the size of the header section 105, the number of headers (real headers 115/115' and/or fake headers 120) in the header section 105, the size of each header in the header section 105, and the size of the body 110, etc. In some embodiments, the archive manager 310 can also configure the extent of overprovisioning in the digital archive 100. For example, the archive manager 310 can set a limit on the number of real headers 115/115' in the header section 105 or on the ratio of real headers 115/115' over the total headers (real headers 115/115' or fake headers 120).

The archive manager 310 can also set a limit on the size of each real content 125/125' or the total number of real contents 125/125' that can be stored effectively in the digital archive 100. In one example, the archive manager 310 can configure the digital archive 100 automatically, based on, for example, certain attributes (e.g., size) of the digital archive 100. In another example, the archive manager 310 can configure the digital archive 100 based on a system/user/network policy. In yet another example, the archive manager 310 can configure the digital archive 100 based user inputs, such as through the input interface 320. The archive manager 310 can help maintain overprovisioning of the digital archive 100 (including the header section 105 and/or the body 110) in order to provide effective and robust security features of the digital archive 100.

The input interface 320 can receive real contents to be encrypted and stored in a digital archive 100. The real contents can be received from a user or from a coupled computing device. In some embodiments, the input interface 320 can also receive the encryption information (e.g., a passphrase) for real contents. In addition, the input interface 320 can also receive configuration information for the digital archive 100. The input interface 320 can be a hardware interface (e.g., a USB connection), a software interface (e.g., an API), or a combination of both.

The header section manager 330 can manage a header section 105 of a digital archive 100. In some embodiments, the header section manager 330 can determine a header location (e.g., an index) in the header section 105 for a real header 115/115'. The header location can be generated randomly or based on certain algorithms/policies. Managing locations of real headers 115/115' in the header section 105 can help ensure a new real header does not collide or overlap with any existing real headers.

The body manager 340 can manage a body 110 of a digital archive 100. In some embodiments, the body manager 340 can determine a content location (e.g., a start location) in the body 110 for a real content 125/125'. The content location can be generated randomly or based on certain algorithms/policies. Managing locations of real contents 125/125' in the body 110 can help ensure a new real content does not collide or overlap with any existing real contents.

The real header generator 350 can generate a real header 115/115'. One real header 115/115' can be generated for each real content received at, for example, the input interface 320. The real header generator 350 can coordinate with the encryption/decryption engine 360 (discussed later) to encrypt some or all portions of a real header 115/115'. The real header 115/115' can refer to the corresponding real content 125/125', by including, for example, a start location 240. The real header 115/115' can also contain encryption/decryption information (e.g., content key 260) for the corresponding real content 125/125'.

The encryption/decryption engine 360 can provide the encryption/decryption mechanisms/services for using the digital archive 100. The encryption/decryption engine 360 can encrypt a real header 115/115' and a real content 125/125' when the new content is added into the digital archive 100. The encryption/decryption engine 360 can also decrypt a real header 115/115' and a real content 125/125' when the existing real content is retrieved from the digital archive 100.

The encryption/decryption facilitator 370 can coordinate with the encryption/decryption engine 360 and facilitate encryption/decryption of the digital archive 100. In one embodiment, if encryption information is not provided when a new real content is being added to the digital archive 100, the encryption/decryption facilitator 370 can generate the encryption information (e.g., a passphrase, an encryption initialization vector (IV), an encryption key, etc.) for encrypting the real content. In another embodiment, the encryption/decryption facilitator 370 can generate the header salt 210 for a new real header 115/115'. A header salt 210 can enhance security of the digital archive 100. In yet another embodiment, the encryption facilitator 370 can generate hashes for a real header 115/115' and/or a real content 125/125' when the new real content is added into the digital archive 100; the encryption facilitator 370 can also verify hashes for a real header 115/115' and/or a real content 125/125' when the existing real content is retrieved from the digital archive 100.

The random byte generator 380 can generate random bytes. In some embodiments, the random byte generator 380 can generate cryptographically random bytes. The cryptographically random bytes can appear similar to and sometimes be indistinguishable from the bytes of an encrypted real header and/or an encrypted real content. The cryptographically random bytes can be used to disguise the existence of any real headers 115/115' and/or real contents 125/125' in the digital archive 100. The cryptographically random bytes can be in the form of cryptographically strong pseudo-random data. In one example, cryptographically strong pseudo-random data can be data generated using a cryptographically secure pseudorandom number generator such that the data is suitable for use in cryptography, in particular that the data can pass the next-bit-test and withstand state compromise extensions.

Still referring to FIG. 3, in addition to managing the header section 105 and determining header locations, the header section manager 330 can also insert a generated real header 115/115' into the header section 105 and fill the fake headers 120 in the header section 105 with cryptographically random bytes (e.g., generated by the random byte generator 380). The fake headers 120 in the header section 105 can help disguise the existence of any real headers 115/115' and/or the number of real headers 115/115'. In addition to managing the body 110 and determining content locations, the body manager 340 can also insert an encrypted real content 125/125' into the body 110 and fill the fake contents 130 in the body 110 with cryptographically random bytes (e.g., generated by the random byte generator 380). The fake contents 130 in the body 110 can help disguise the existence of any real contents 125/125' and/or the number of real contents 125/125'.

Figure 4:
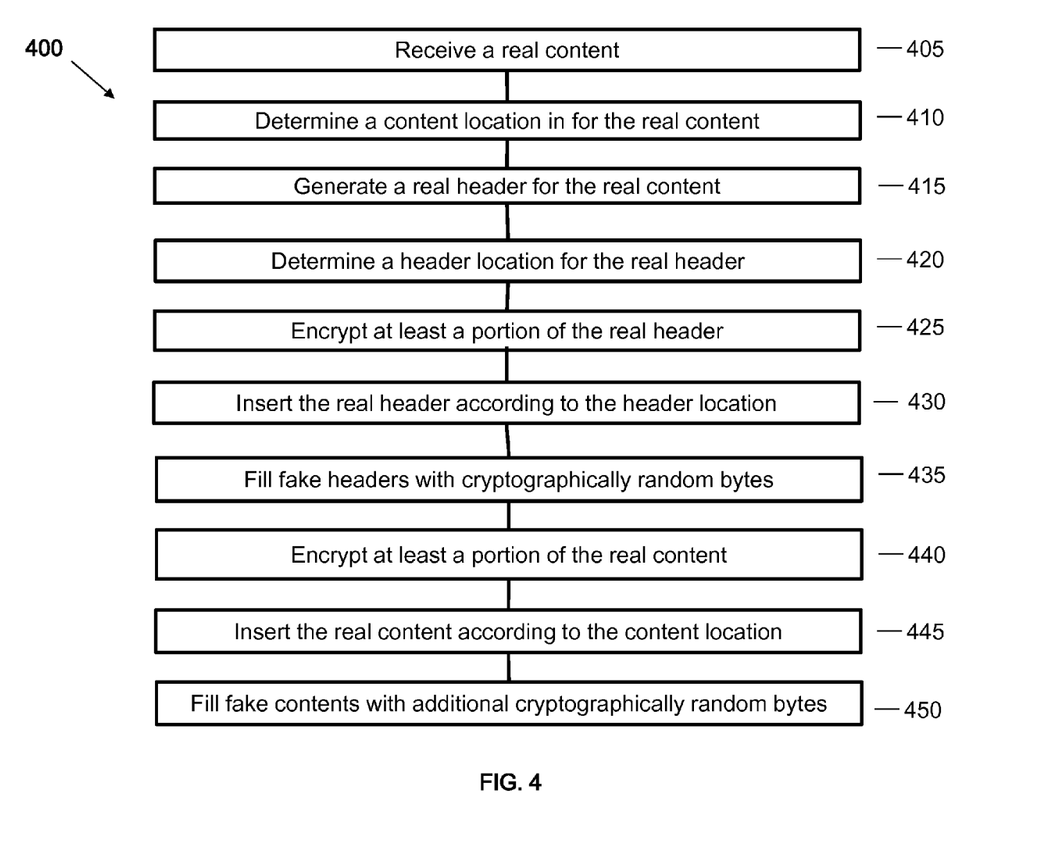
FIG. 4 illustrates an exemplary operation of storing encrypted content according to certain embodiments of the disclosed subject matter.

FIG. 4 illustrates an exemplary operation 400 of storing encrypted contents according to certain embodiments of the disclosed subject matter. The operation 400 can be modified by, for example, having stages rearranged, changed, added and/or removed.

At stage 405, a real content can be received at, for example, an input interface 320 of an encrypted content storing system 300. The real content can be processed and stored, e.g., in a body 110 of a digital archive 100. The real content can be, for example, a digital certificate to sign a file, a short message, etc.

At stage 410, a content location (e.g., in the body 110 of a digital archive 100) can be determined for the received real content. The content location can be determined, e.g., by a body manager 340 of an encrypted content storing system 300. In some embodiments, the content location can be randomly selected among available content locations as long as the new real content would not overlap with any existing real contents.

At stage 415, a real header can be generated for the received real content by, for example, the real header generator 350 of the encrypted content storing system 300. The generated real header can contain the content location (e.g., a start location) determined for the real content and can also contain decryption information (e.g., an encryption/decryption key) for the real content. The decryption information can be generated automatically or can be received from an owner/source/possessor/controller of the real content. Optionally, a header salt can be generated and added to the real header 115/115'.

At stage 420, a header location (e.g., in the header section 105 of a digital archive 100) can be determined for the real header. The header location can be determined, e.g., by a header section manager 330 of an encryption content storing system 300. In some embodiments, the header location can be randomly selected among available header locations as long as the new real header would not overlap with any existing real headers.

At stage 425, at least a portion of the real header can be encrypted using, for example, header encryption information (e.g., an encryption/decryption key). The header encryption information (e.g., a passphrase) can be generated automatically or can be received from an owner/source/possessor/controller of the real content. The encryption can be performed by, for example, the encryption/decryption manager 360 of the encrypted content storing system 300.

At stage 430, the real header can be inserted into the header section 105 according to the header location as determined by, for example, the header section manager 330. For example, if the header location defines an index location for the real header 115/115' in the header section 105, the real header 115/115' can be inserted in the header section 105 at the index location. The real header can be inserted, e.g., by a header section manager 330 of an encrypted content storing system 300.

At stage 435, fake headers in the header section 105 can be filled with cryptographically random bytes as generated by, for example, the random byte generator 380. The fake headers can be filled by, for example, the header section manager 330 of the encrypted content storing system 300.

At stage 440, at least a portion of the real content can be encrypted using, for example, content encryption information (e.g., an encryption/decryption key). The content encryption information can be generated automatically or can be received from an owner/source/possessor/controller of the real content. The content encryption information can be same as or different from the header encryption information. The encryption can be performed, e.g., by an encryption/decryption manager 360 of an encrypted content storing system 300.

At stage 445, the real content can be inserted into the body 110 according to the content location as determined by, for example, the body manager 340. For example, if the content location defines a start location for the content in the body 110, the real content can be inserted in the body 110 at the start location. The real content can be inserted by, for example, the body manager 340 of an encrypted content storing system 300.

At stage 450, fake contents in the body 110 can be filled with cryptographically random bytes as generated by, for example, the random byte generator 380. The fake contents can be filled by, for example, the body manager 340 of the encrypted content storing system 300.

In addition to the stages discussed above, a size of the digital archive can be determined before a real content is stored in the digital archive. In one example, the size of the digital archive can be determined at least partially based the number and/or amount of expected real contents. As discussed above, overprovisioning of the digital archive 100 (including the header section 105 and/or the body 110) can help provide effective and robust security features of the digital archive 100.

Retrieving a real content 125/125' stored in the digital archive 100 by an authorized user with correct decryption information (e.g., a passphrase) can be straightforward.

According to certain embodiments, accessing a real content 125/125' in the digital archive 100 usually requires first identifying the corresponding real header 115/115', which can provide the content location of the real content 125/125' in the body 110 of the digital archive 100. The corresponding real header 115/115' can be identified by decrypting and verifying each header in the header section 105 until the corresponding real header 115/115' is successfully identified. The headers in the header section 105 can be processed (e.g., decryption and verification, etc.) in parallel or in sequence. In one example, the following steps can be performed for each header in the header section 105.

- The header salt can be read from the header and combined with an input passphrase to generate the header key. This can be designed to be a lengthy process to slow down any brute-force attacks. Statistically, half of the headers need to be decrypted before the correct header is identified. Given the potentially large number of headers, a very large number of potential header keys need to be generated and thus any header attack can be very costly and time-consuming.
- The generated header key can then be used to decrypt the header. If decryption is successful, the right real header can be identified. Otherwise, the process can stop and move on to the next header. If the real header contains a header hash, the relevant parts of the real header can be hashed again and the resulting hash can then be compared to the stored hash to check for any tempering or corruption.
- The reference (e.g., a start location) to the real content and any content decryption information can next be retrieved from the identified real header.
- The real content can be now located and decrypted. If there is a content hash, the relevant parts of the real content can be hashed again and the resulting hash can then be compared to the stored hash to check for any tempering or corruption.

In one exemplary use of an encrypted content store system 300, multiple files can be encrypted and stored at random points in a much larger digital archive 100 which contains mostly random and meaningless bytes. In this example, the files stored in the digital archive 100 can be small messages or certificates (e.g., ~4 Kb in size); the digital archive 100 can be much larger (e.g., ~100 Mb in size, or 100,000 times larger than the files). Such a digital archive can provide a secure mechanism to store a single secret (e.g., message, certificate, or any file, etc.). According to some embodiments, the digital archive itself (including, e.g., a header section and a body) does not provide any information or hint on how many, if any, secrets are stored in the digital archive. Thus, an unauthorized party would not know how many, if any, secrets are stored in the digital archive 100.

In another exemplary use of an encrypted content store system 300, multiple users can each store a secret in a digital archive 100. Each user can provide a secret and a unique passphrase for its secret. The multiple secrets can be stored in the digital archive 100 collectively. However, each user is only aware that its own secret is stored in the digital archive 100; each user is unaware how many, if any, other secrets of the other users are stored in the digital archive 100. In addition, each user is only capable of retrieving its own secret from the digital archive 100 since the unique passphrase for her own secret is unknown to the other users.

Figure 5:
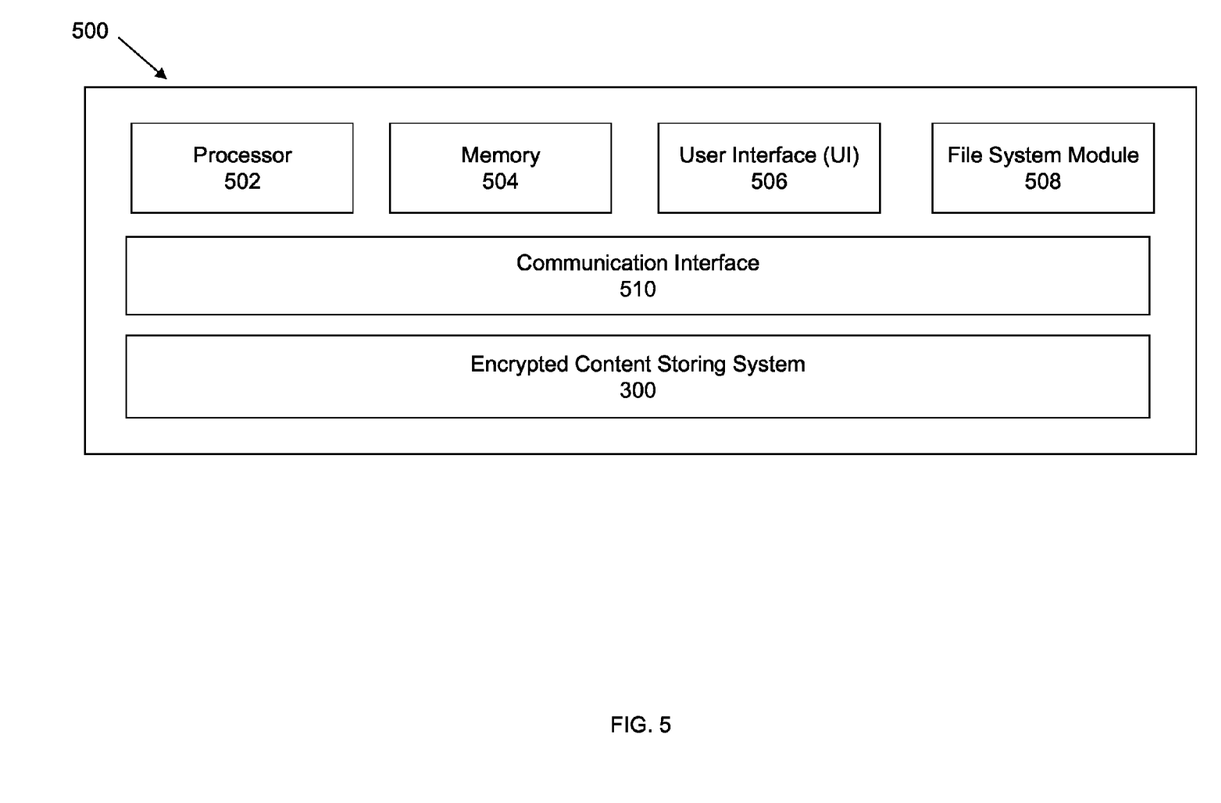
FIG. 5 illustrates a block diagram of an exemplary computing device according to certain embodiments of the disclosed subject matter.

FIG. 5 illustrates a block diagram of an exemplary computing device 500 that can be used to implement one or more aspects of the functionality described herein. The computing device 500 can serve, for example, as a host device for an encrypted content storing system 300. The computing device 500 can include at least one processor 502 and at least one memory 504. The processor 502 can be hardware that is configured to execute computer readable instructions such as software. The processor 502 can be a general processor or be an application specific hardware (e.g., an application specific integrated circuit (ASIC), programmable logic array (PLA), field programmable gate array (FPGA), or any other integrated circuit). The processor 502 can execute computer instructions or computer code to perform desired tasks. The memory 504 can include volatile and/or non-volatile computer readable medium, such as flash memory, a magnetic disk drive, an optical drive, a programmable read-only memory (PROM), a read-only memory (ROM), a random access memory (RAM), or any other memory or combination of memories.

The computing device 500 can also optionally include a user interface (UI) 506, a file system module 508, and a communication interface 510. The UI 506 can provide an interface for users to interact with the computing device 500, e.g., in order to access the encrypted content storing system 300. The file system module 508 can be configured to maintain a list of all data files, including both local data files and remote data files, in every folder in a file system. The file system module 508 can be further configured to coordinate with the memory 504 to store and cache files/data. The communication interface 510 can allow the computing device 500 to communicate with external resources (e.g., a network or a remote client/server). The computing device 500 can also include an encrypted content storing system 300. The description of the encrypted content storing system 300 and its functionalities can be found in the discussion relating to FIGS. 1-4. The computer device 500 can include additional modules, fewer modules, or any other suitable combination of modules that perform any suitable operation or combination of operations.

Embodiments of the disclosed subject matter can provide at least the following advantages:

- It can be difficult, if not impossible, for an attacker to determine if all secrets have been recovered from an archive.
- There is typically no need to grant permission to create or mount file systems, unlike other security mechanisms such as TrueCrypt.
- Any number of secrets can be stored, subject to limitations according to the sizes of the secrets and the digital archive.
- It can be implausible to attack the contents in the body directly since the starting locations are difficult, if not impossible, to determine.
- It can be time consuming to attack the headers since most headers are fake and contain garbage and meaningless information. Efforts must be expended to crack each header to determine if it is a real header. A header attack is costly, partially because for each header each potential key needs to be generated from each potential passphrase and a unique salt through a key generation algorithm.
- Decryption by an authorized user with a valid passphrase is straightforward since only one key is typically generated for each header.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible hardware that is configured to execute computer readable instructions. Additionally, the term "based on" is open ended and is not intended to be limiting. For example, if A is "based on" B, then A is a function of B, and potentially C, D, and E.

What is claimed is:

1. A non-transitory computer readable medium comprising a digital archive for storing encrypted content, the digital archive comprising: a header section, including: a first number of real headers, wherein at least a portion of each of the first number of real headers is encrypted; and a second number of fake headers, wherein each of the second number of fake headers is filled with cryptographically random bytes, wherein the second number is substantially greater than the first number; and a body, including: the first number of real content, wherein at least a portion of each of the first number of real content is encrypted, wherein each of the real headers contains a start location of the corresponding real content in the body and the start location is a modulus of a size of the digital archive; and fake content in the rest of the body, wherein the fake content contains additional cryptographically random bytes, wherein the amount of the fake content is substantially greater than the amount of the real contents, wherein each of the first number of real headers refers to a corresponding one of the first number of real content in the body and contains decryption information for the corresponding one of the first number of real contents, wherein each of the real headers contains a header salt for decrypting the real header.

2. The non-transitory computer readable medium of claim 1, wherein each of the real headers contains an end location of the corresponding real content in the body.

3. The non-transitory computer readable medium of claim 2, wherein the end location is a modulus of a size of the digital archive.

4. The non-transitory computer readable medium of claim 1, wherein less than 1% of the header section contains real headers.

5. The non-transitory computer readable medium of claim 1, wherein each of the real headers contains a header salt for decrypting the real header.

6. The non-transitory computer readable medium of claim 1, wherein each of the real headers contains a header initialization vector (IV) for decrypting the each of the real header.

7. The non-transitory computer readable medium of claim 1, wherein each of the real headers contains a header hash for verifying decryption of the real header.

8. The non-transitory computer readable medium of claim 1, wherein each of the real headers contains a content key for decrypting the corresponding real content in the body.

9. The non-transitory computer readable medium of claim 1, wherein each of the real headers contains a content initialization vector (IV) for decrypting the corresponding real content in the body.

10. The non-transitory computer readable medium of claim 1, wherein each of the real headers contains a content hash for verifying decryption of the corresponding real content in the body.

11. The non-transitory computer readable medium of claim 1, wherein each of the real headers and the fake headers has a fixed size.

12. The non-transitory computer readable medium of claim 1, further comprising a master header defining a size of the header section.

13. The non-transitory computer readable medium of claim 1, further comprising a master header defining a layout of the header section.

14. The non-transitory computer readable medium of claim 13, wherein the master header contains a start location of each of the first number of real headers and the second number of fake headers in the header section.

15. A computerized method for storing encrypted contents in a digital archive, comprising: receiving real content to be stored in a body of the digital archive; determining a content location in the body for the real content; determining a size of the digital archive; generating a real header for the real content, the real header referring to the content location of the real content and containing content decryption information relating to the real content; determining a header location in a header section of the digital archive for the real header; encrypting at least a portion of the real header using header encryption information; generating a header salt for the real header; adding the header salt to the real header; inserting the real header into the header section according to the header location; filling unused portions of the header section with fake headers that include cryptographically random bytes, wherein the number of fake headers is substantially greater than the number of encrypted contents; encrypting at least a portion of the real content with content encryption information; inserting the real content into the body according to the content location; and filling unused portions of the body with fake content that includes additional cryptographically random bytes, wherein the amount of fake content is substantially greater than the amount of encrypted contents.

16. The computerized method of claim 15, further comprising determining the size of the digital archive at least partially based on a number and amount of expected real contents.

17. A system for storing encrypted contents in a digital archive, comprising: an input interface configured to receive real content to be stored in a body of the digital archive; a body manager configured to manage the body of the digital archive, determine a size of the digital archive and determine a content location in the body for the real content; a real header generator configured to generate a real header for the real content, wherein the real header referring to the content location of the real content and containing content decryption information relating to the real content; a header section manager configured to manage a header section of the digital archive and determine a header location for the real header; and an encryption engine configured to encrypt the real header and real content; generate a header salt; add the header salt to the real header, wherein the header section manager is further configured to insert the real header into the header section according to the header location and to fill unused portions of the header section with fake headers that include cryptographically random bytes, the number of fake headers being substantially greater than the number of encrypted contents; wherein the body manage is further configured to insert the real content into the body according to the content location and to fill unused portions of the body with fake content than the amount of encrypted contents.

18. The system of claim 17, wherein the input interface is further configured to receive header encryption information.

19. The system of claim 17, further comprising an archive manager configured to manage the digital archive.

20. The system of claim 17, further comprising an encryption facilitator configured to facilitate encryption.

21. The system of claim 17, further comprising a random byte generator configured to generate the cryptographically random bytes and the additional cryptographically random bytes.

\* \* \* \* \*